United States Patent [19]
Elvidge et al.

[11] Patent Number: 5,899,527
[45] Date of Patent: May 4, 1999

[54] FISHERMAN'S CHAIR SYSTEM

[76] Inventors: Scott Edward Elvidge, 78 Smith Street, Chateauguay, Quebec, Canada, J6J 5J8; Shawn Patrick Elvidge, 36 Marquette Street, Chateauguay, Quebec, Canada, J6J 5G9

[21] Appl. No.: 09/138,383

[22] Filed: Aug. 24, 1998

[51] Int. Cl.$^6$ .............. A01K 97/10; A47C 7/62
[52] U.S. Cl. .............. 297/188.14; 297/188.01; 248/538
[58] Field of Search .......... 297/188.01, 188.14, 297/188.18, 188.2, 188.21; 248/538

[56] References Cited

U.S. PATENT DOCUMENTS

| | | | |
|---|---|---|---|
| 2,427,600 | 9/1947 | Hanke | 248/538 |
| 3,151,910 | 10/1964 | Larson | 297/188.01 X |
| 5,313,734 | 5/1994 | Roberts | 248/538 X |
| 5,325,620 | 7/1994 | Reed et al. | 248/538 X |
| 5,625,974 | 5/1997 | Demaio | 248/538 X |

*Primary Examiner*—Peter R. Brown

[57] ABSTRACT

A fisherman's chair system comprising a chair having a seat in a generally horizontal orientation, a back coupled therebetween and with generally horizontal arms above opposite edges of the seat with four downwardly extending legs. A rod holder is provided with a generally cylindrical forward extent constituting a majority of the length of the holder with a rear end formed with an upwardly extending enlarged tube for receiving the handle of a fishing rod. A threaded rod clamp is secured to the forward end of the holder to secure the handle of the fishing rod therein. A rod extends upwardly from the upper surface of one of the arms with a hinge and adjustment knob secured to the upper end of the rod and the lower surface of the holder for allowing the selective angular positioning of the holder with respect to its supporting arm.

6 Claims, 2 Drawing Sheets

FISHERMAN'S CHAIR SYSTEM

BACKGROUND OF THE INVENTION

1. Field of the Invention

The present invention relates to a new and improved fisherman's chair system and, more particularly, pertains to a fisherman's chair system.

2. Description of the Prior Art

The use of chairs of known designs and configurations is known in the prior art. More specifically, chairs of known designs and configurations heretofore devised and utilized for the purpose of increasing the efficiency and comfort of fisherman through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of chairs of known designs and configurations. By way of example, U.S. Pat. No. 5,409,291 to Lamb et al. discloses a combined chair and backpack.

U.S. Pat. No. 5,536,064 to MacLean discloses a combination backpack and chair.

U.S. Pat. No. 5,641,197 to Springmann discloses a collapsible sports chair.

International Application Patent Number PCT/US96/10842 to Jay discloses a convertible chair with armrests which converts to a backpack.

U.S. Pat. No. 3,266,686 to Griffith discloses a convertible pack and chair.

Lastly, U.S. Pat. No. Des. 341,261 to Decklover et al. discloses a fishing and outdoor chair.

In this respect, the fisherman's chair system according to the present invention substantially departs from the conventional concepts and designs of the prior art, and in doing so provides an apparatus primarily developed for the purpose of a fisherman's chair system.

Therefore, it can be appreciated that there exists a continuing need for a new and improved fisherman's chair system which can be used for a fisherman's chair system. In this regard, the present invention substantially fulfills this need.

SUMMARY OF THE INVENTION

In view of the foregoing disadvantages inherent in the known types of chairs of known designs and configurations now present in the prior art, the present invention provides a new and improved fisherman's chair system. As such, the general purpose of the present invention, which will be described subsequently in greater detail, is to provide a new and improved fisherman's chair system and methods which have all the advantages of the prior art and none of the disadvantages.

To attain this, the present invention essentially comprises a new and improved fisherman's chair system for increasing the efficiency and comfort of the user. More specifically, the system comprises a chair with a seat in a generally horizontal orientation. The system also includes a back with a hinge coupled to the seat and with generally horizontal arms above opposite side edges of the seat with four downwardly extending legs having upper ends with hinges coupled to the arms. The fisherman's chair system also includes a rod holder with a generally cylindrical forward extent constituting a majority of the length of the holder with an open rear end formed with an upwardly extending enlarged section for receiving the handle of a fishing rod. Also included is a threaded clamp secured to the enlarged section of the holder to secure the handle of the fishing rod therein. Additionally provided is a post extending upwardly from the upper surface of one of the arms with a hinge and an adjustment knob frictionally secured to the upper end of the post and the lower surface of the holder for allowing the selective angular positioning of the holder with respect to its post. Further provided is a pair of shoulder straps coupled to the back for maintaining the user in position on the chair. A cup holder is secured to one of the arms at the end thereof remote from the back for supporting a beverage. A storage box is coupled to the bottom of the legs at their forward extent thereof. Lastly provided is a spring-biased clip for supporting a cloth with a mounting screw extending through the clip into the one side of one of the arms.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fisherman's chair system which has all the advantages of the prior art chairs of known designs and configurations and none of the disadvantages.

It is another object of the present invention to provide a new and improved fisherman's chair system which may be easily and efficiently manufactured and marketed.

It is a further object of the present invention to provide a new and improved fisherman's chair system which is of a durable and reliable construction.

An even further object of the present invention is to provide a new and improved fisherman's chair system which is susceptible of a low cost of manufacture with regard to both materials and labor, and which accordingly is then susceptible of low prices of sale to the consuming public, thereby making such a fisherman's chair system economically available to the buying public.

Even still another object of the present invention is to a fisherman's chair system.

Lastly, it is an object of the present invention to provide a fisherman's chair system comprising a chair having a seat in a generally horizontal orientation, a back coupled therebetween and with generally horizontal arms above opposite edges of the seat with four downwardly extending legs. A rod holder is provided with a generally cylindrical forward extent constituting a majority of the length of the holder with a rear end formed with an upwardly extending enlarged tube for receiving the handle of a fishing rod. A threaded rod clamp secured to the forward end of the holder to secure the handle of the fishing rod therein. A rod extends upwardly from the upper surface of one of the arms with a hinge and adjustment knob secured to the upper end of the rod and the lower surface of the holder for allowing the selective angular positioning of the holder with respect to its supporting arm.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
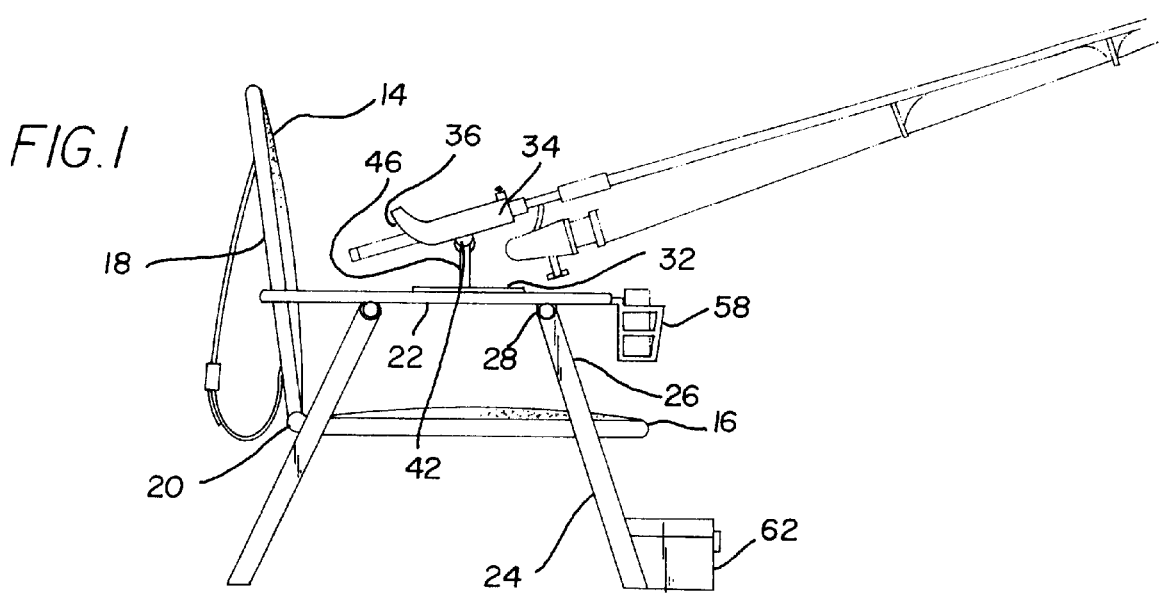
FIG. 1 is a side elevational view of the preferred embodiment of the fisherman's chair system constructed in accordance with the principles of the present invention.
Figure 2:
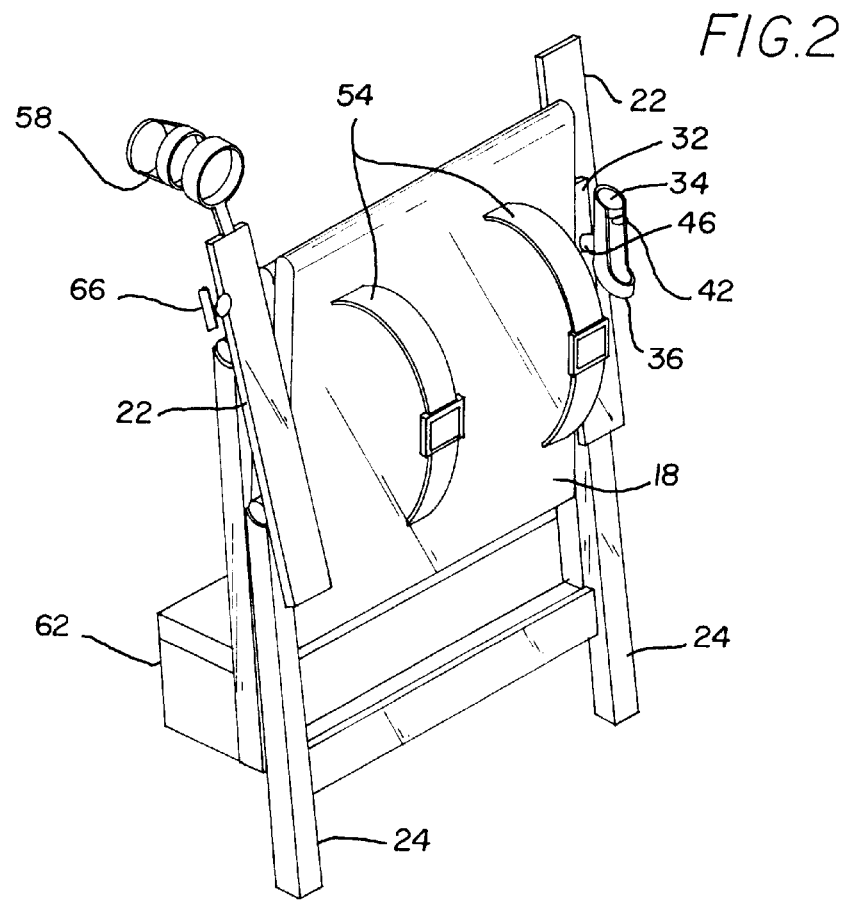
FIG. 2 is a rear view of the system shown in FIG. 1 but in a collapsed orientation.
Figure 3:
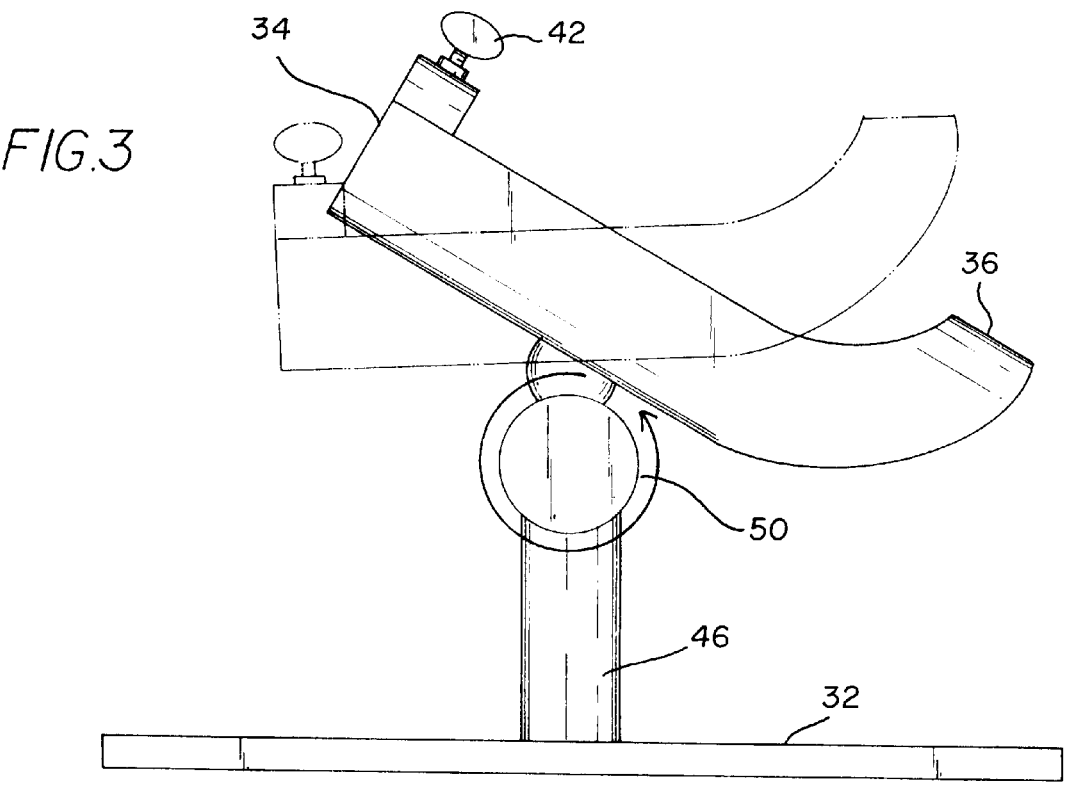
FIG. 3 is an enlarged showing of the post and rod holder.
Figure 4:
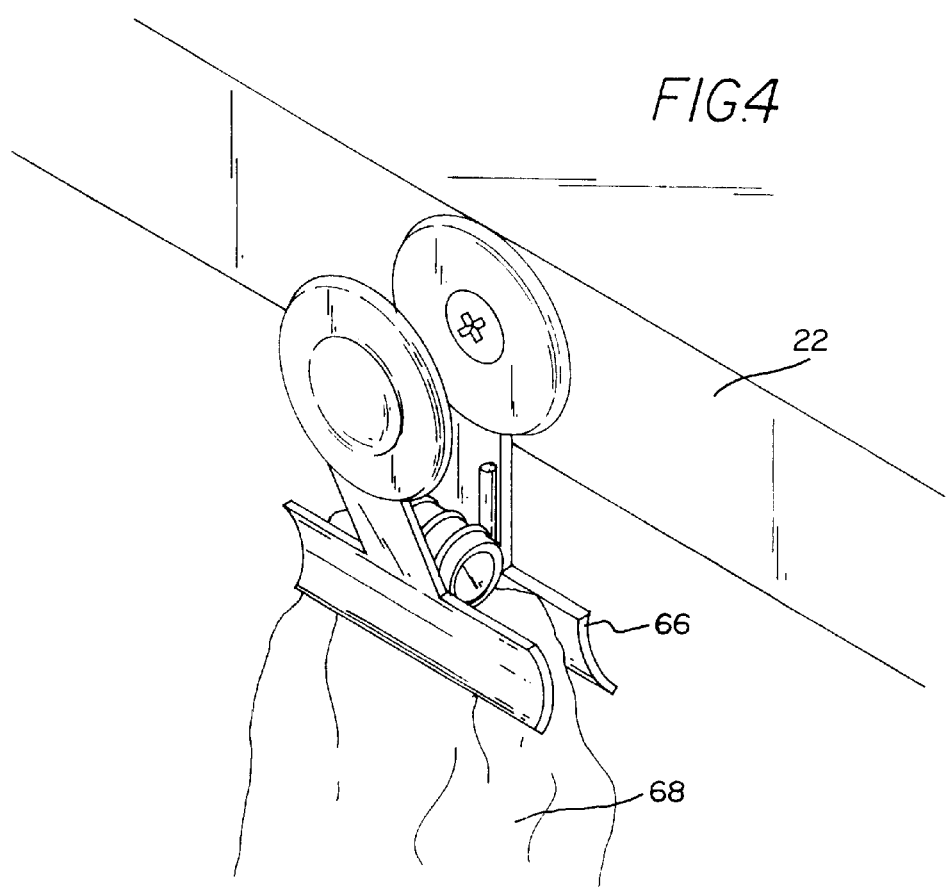
FIG. 4 is a perspective view of the clip and claw shown in FIG. 2.

With reference now to the drawings, the preferred embodiment of the new and improved fisherman's chair system embodying the principles and concepts of the present invention and generally designated by the reference numeral 10 will be described.

The present invention, the new and improved fisherman's chair system is a system 10 comprised of a plurality of components. Such components, in their broadest context, include a chair, a rod holder and a threaded clamp. Each of the individual components is specifically configured and correlated one with respect to the other so as to attain the desired objectives.

The new and improved fisherman's chair system 10 for increasing the efficiency and comfort of the user comprises, in combination, a chair 14 with a seat 16 in a generally horizontal orientation. The system also includes a back 18 with a hinge 20 coupled to the seat and with generally horizontal arms 22 above opposite side edges of the seat with four downwardly extending legs 24 having upper ends 26 with hinges 28 coupled to the arms.

The fisherman's chair system also includes a rod holder 32 with a generally cylindrical forward extent 34 constituting a majority of the length of the holder with an open rear end 36 formed with an upwardly extending enlarged section for receiving the handle of a fishing rod.

Also included is a threaded clamp 42 secured to the enlarged section of the holder to secure the handle of the fishing rod therein.

Additionally provided is a post 46 extending upwardly from the upper surface of one of the arms with a hinge 48 and an adjustment knob 50 frictionally secured to the upper end of the post and the lower surface of the holder for allowing the selective angular positioning of the holder with respect to its post.

Further provided is a pair of shoulder straps 54 coupled to the back for maintaining the user in position on the chair.

A cup holder 58 is secured to one of the arms at the end thereof remote from the back for supporting a beverage.

A storage box 62 is coupled to the bottom of the legs at their forward extent thereof.

Lastly provided is a spring-biased clip 66 for supporting a cloth 68 with a mounting screw extending through the clip into the one side of one of the arms.

The system as described hereinabove is a portable folding outdoor chair designed to provide convenience and comfort for the user while bait fishing from bank, pier or shore.

The chair can be molded in plastic. It is jointed to fold flat, and features adjustable backpack straps attached to the back of the user to allow easy "no-hands" carrying to and from the fishing site. Snap clips are designed to keep the chair from opening while carrying. Seat pads with easy clean covering shall be included for attachment to eh seat bottom and seat back.

Several convenient features are provided in the arms of the chair. A telescopic rod holder is attached to one arm with a small cross-shaped handle that allows the user to raise and lower its position for preferred comfort. The other arm of the chair features a beverage holder bracket and a spring clip rag holder.

Attached beneath the front of the seat is a compact storage box for bait or tackle. This box features removable plastic dividers that fit in slats in the side of the box, allowing the fisherman to adjust space as needed for storage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fisherman's chair system for increasing the efficiency and comfort of the user comprising, in combination:

a chair having a seat in a generally horizontal orientation, a back with a hinge coupled to the seat and with generally horizontal arms above opposite side edges of the seat with four downwardly extending legs having upper ends with hinges coupled to the arms;

a rod holder having a generally cylindrical forward extent constituting a majority of the length of the holder with an open rear end formed with an upwardly extending enlarged section only on an upper side of said rear end for receiving the handle of a fishing rod;

a threaded clamp secured to the enlarged section of the holder to secure the handle of the fishing rod therein;

a post extending upwardly from the upper surface of one of the arms with a hinge and adjustment knob frictionally secured to the upper end of the post and the lower surface of the holder for allowing the selective angular positioning of the holder with respect to its post;

a pair of shoulder straps coupled to the back for maintaining the user in position on the chair;

a cup holder secured to one of the arms at the end thereof remote from the back for supporting a beverage;

a storage box coupled to the bottom of the legs at their forward extent thereof; and a spring-biased clip for supporting a cloth with a mounting screw extending through the clip into the one side of one of the arms.

2. A fisherman's chair system comprising:

a chair having a seat in a generally horizontal orientation, a back coupled therebetween and with generally horizontal arms above opposite edges of the seat with four downwardly extending legs;

a rod holder having a generally cylindrical forward extent constituting a majority of the length of the holder with a rear end formed with an upwardly extending enlarged tube only on an upper side of said rear end for receiving the handle of a fishing rod;

a threaded rod clamp secured to the forward end of the holder to secure the handle of the fishing rod therein; and a post extending upwardly from the upper surface of one of the arms with a hinge and adjustment knob secured to the upper end of the rod and the lower surface of the holder for allowing the selective angular positioning of the holder with respect to its supporting arm.

3. The system as set forth in claim 2 and further comprising a pair of shoulder straps coupled to the back for maintaining the user in position on the chair.

4. The system as set forth in claim 2 and further comprising a cup holder secured to one of the arms at the end thereof remote from the back for supporting a beverage.

5. The system as set forth in claim 2 and further comprising a storage box coupled to the bottom of the legs at their forward extent thereof.

6. The system as set forth in claim 2 and further comprising a spring-biased clip for supporting a cloth with a mounting screw extending through the clip into one of the arms.

* * * * *